April 14, 1953 E. M. HICKS 2,634,869
BRICK HANDLING MACHINE
Filed March 28, 1949 6 Sheets-Sheet 1

INVENTOR
Ernest M. Hicks
BY
ATTORNEY

April 14, 1953 E. M. HICKS 2,634,869
BRICK HANDLING MACHINE
Filed March 28, 1949 6 Sheets-Sheet 2

INVENTOR
Ernest M Hicks
BY
ATTORNEY

April 14, 1953　　　　　　E. M. HICKS　　　　　2,634,869
BRICK HANDLING MACHINE
Filed March 28, 1949　　　　　　　　　　　　6 Sheets-Sheet 3

INVENTOR
Ernest M. Hicks
BY
ATTORNEY

April 14, 1953  E. M. HICKS  2,634,869
BRICK HANDLING MACHINE
Filed March 28, 1949  6 Sheets-Sheet 4

INVENTOR
Ernest M. Hicks,
BY
ATTORNEY

April 14, 1953  E. M. HICKS  2,634,869
BRICK HANDLING MACHINE
Filed March 28, 1949  6 Sheets-Sheet 6

INVENTOR.
Ernest M Hicks
BY
Sawyer & Kennedy
ATTORNEY

Patented Apr. 14, 1953

2,634,869

UNITED STATES PATENT OFFICE 2,634,869

BRICK HANDLING MACHINE

Ernest M. Hicks, Kingston, N. Y., assignor to Ulster Foundry Corporation, New York, N. Y.

Application March 28, 1949, Serial No. 83,913

2 Claims. (Cl. 214—16)

This invention relates to brick handling machinery.

In the manufacture of bricks, the bricks, as they are produced by the brick making machine, are carried away by conveyor cables or the like and may be stacked on cars for drying in a kiln or oven or may be placed upon pipe racks, generally heated by steam and dried therein. In the latter type of operation, it has been common for many years to carry the bricks on pallets by means of a pair of conveyor cables which run alongside a pipe rack and generally between two facing pipe racks, as shown, for example, in Martin Patent 956,123, granted April 26, 1910. The pallets as they come along are picked off the conveyor by a crew of men stationed at the pipe racks and are slid into the pipe racks. Since the speed of production of a brick machine may be quite high and the frequency with which a pallet is supplied by the conveyors correspondingly high, and since the loaded pallets are quite heavy and must be lifted and lowered with relation to the conveyor in filling the racks, the work involved is exacting and expensive. The general object of the present invention is to provide a brick handling mechanism associated with a conveyor and pipe racks and capacitated to transfer the pallets from the conveyor to the pipe racks by power operated mechanism. In this way, the need for a crew of men is eliminated and no great physical strength on the part of the operator is required.

A further object of the invention is to provide a brick handling mechanism of the type indicated in which the necessary operations may be performed, to a large degree, automatically thus requiring less skill and attention on the part of the operator and reducing the chance of errors to the minimum.

With these and still other objects which will appear in the following description in mind, the invention consists in the combinations and arrangements of parts and details of construction which will now first be fully described in connection with the accompanying drawings and then be more particularly pointed out in the appended claims.

Figure 1:
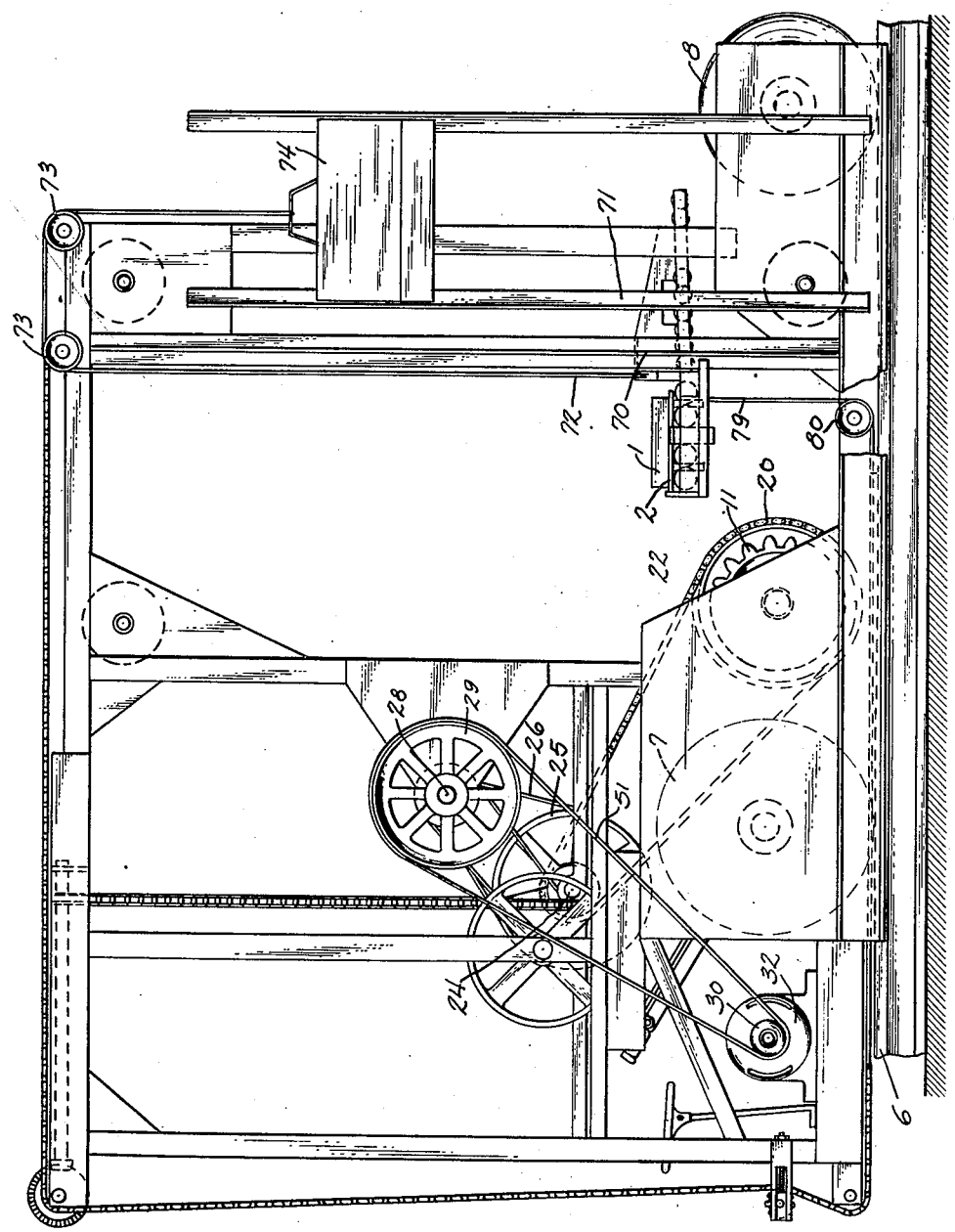
Figure 1 is a side elevation of a brick handling mechanism with certain parts shown in later views omitted for clarity.

The bricks 1 are carried on pallets 2 by means of conveyor cables 3 running along close to the ground or floor and centrally of two lines of pipe racks, indicated schematically and in outline at 4. The carriage 5 is movable along tracks 6, being supported thereon by wheels 7 and 8. The pallets are taken off the conveyor cables 3 by an elevator comprising endless sprocket chains 9 running on idle guide sprockets 10 and drive sprockets 11. Positioned at intervals along the chains 9 are a number of bars 12 on which are swung the pallet carrying hooks 13. Shaft 20, which carries the drive sprockets 11, is driven through sprocket wheel 21 and chain 22 by a sprocket 23 carried on a stub shaft 24, which in turn is driven by pulley wheel 25 and belts 26 running around drive pulley 27 on cross shaft 28. Shaft 28 is driven by means of pulleys 29 and 30 and belt 31 from electric motor 32. The spacing of carriers 13 and speed of movement of sprocket chains 9 will be synchronized with the frequency of delivery of the pallets by conveyor cables 3 so as normally to load each carrier 13 and prevent accumulation of pallets along the conveyor cables 3. The speed of motor 32 may be adjustable, when desired. However, if an occasional carrier travels empty or a few pallets accumulate, the operation will still be satisfactory.

Figure 3:
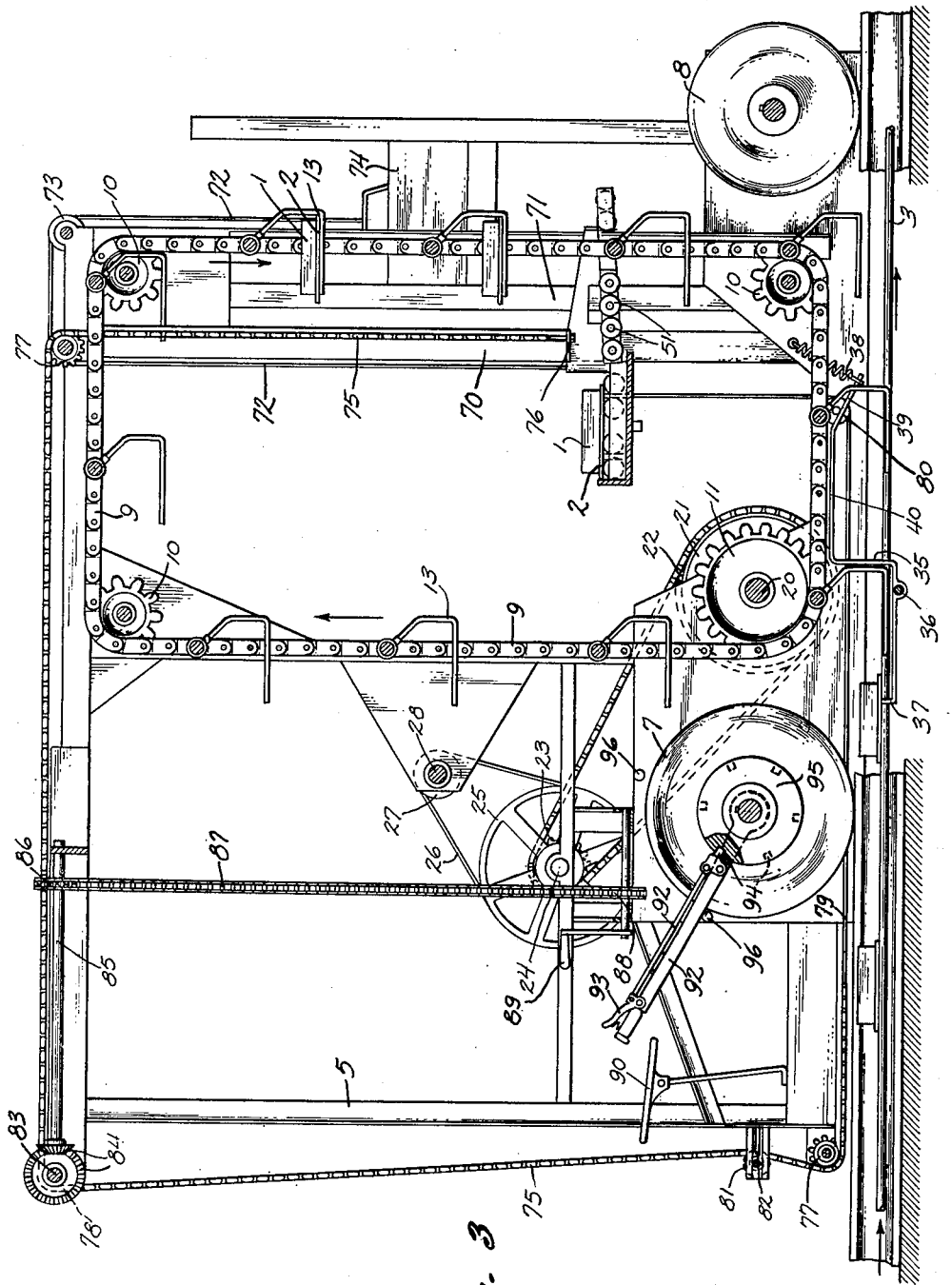
Figure 3 is a section on the line 3—3 of Figure 2.

With the carriage in any given position, the pallets will be delivered to the successive carriers or hooks 13 by the conveyor cables 3, as indicated in Figure 3. As there indicated, the travel of conveyor chains 9 is clockwise, while the conveyor cables 3 are moving toward the right. The lower courses of the sprocket chains 9 and the conveyor cables 3 are therefore moving in opposite directions, so that, as will be apparent, the pallets are successively loaded onto the successive hooks 13 of the conveyor. As pointed out above, the speed of movement of the chains 9 is synchronized with that of the conveyor cables 3, so that a pallet will normally be supplied to each pair of hooks and accumulation of pallets on the conveyor cables 3 will normally be avoided. Furthermore, to avoid possible interference in the operation of the parts due to accumulation of pallets, latch mechanisms, as shown in Figure 3, are provided. The latch mechanism on each side of the machine comprises a crooked lever 35 pivoted at 36 and having a toe 37 which is biased downwardly by means of a spring 38 at the opposite end of the lever 35. The lever 35 has a slanted end 39 leading to a cam section 40 adapted for engagement by the bars 12. As will be apparent, if a bar 12 is over section 40 of the lever 35, it will lift the toe 37, permitting any pallet which is over this toe or beyond it to pass onto the carrier 13, but coming up and holding back any succeeding pallets until the proper time. At this time, spring 38 will be permitted to drop the toe 37, thus permitting passage of the next pallet. The conveyor 9 carries the pallets all the way up to the top of the carriage and then proceeds to bring them down again, as indicated in Figure 3, so that they may be deposited upon a shuttle mechanism for introducing them into the pipe racks on either side of the carriage.

Figure 4:
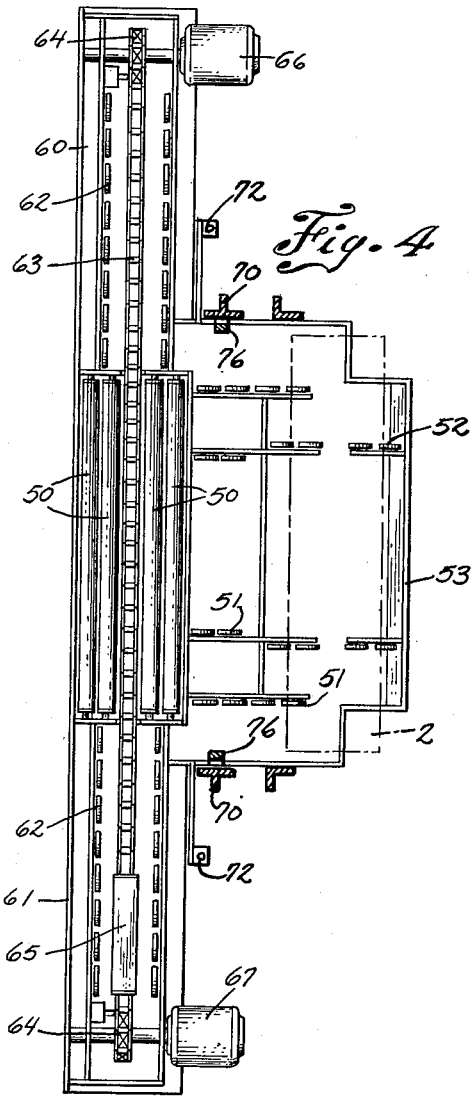
Figures 4 and 5 are detail plan views showing that part of the mechanism of earlier figures which is more particularly concerned with the transverse movement of the pallets and insertion thereof into the pipe racks.
Figure 5:
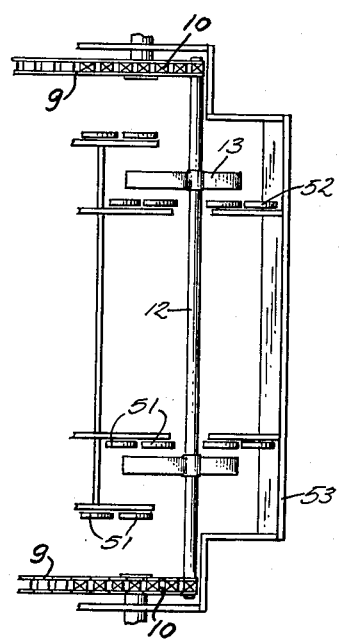

The shuttle mechanism, which is shown in detail in Figures 4 and 5, comprises a central section having transverse rollers 50 for receiving a pallet. Cooperating with this central section is a set of roller wheels 51 forming an inclined platform adjacent which the bars 12 and carriers 13 pass, as indicated in Figures 5 and 3. The inclined platform is extended and supplemented by rollers 52 carried in a framework 53, the bars 12 passing downwardly between the two sets of rollers and depositing the pallet thereon. The pallet, when so deposited, will roll down (to the left in Figures 3 and 4) onto the central section formed by the rollers 50, and is now ready to be shoved onto a pipe rack to either the left or the right of the carriage. The shuttle framework extends to both sides of the carriage, as indicated at 60 and 61, and carries a number of rollers 62 for supporting the pallets in their movement widthwise of the carriage. A sprocket chain 63, carried on sprockets 64 at each end of the shuttle frame, carries a pusher 65 and is driven by a pair of electric motors and speed-reducer units 66 and 67. By actuating unit 66, the pallet may be taken off the central section of rollers 50 by the pusher 65, which moves from the position of Figure 4 toward reducing unit 66, and shoves the pallet all the way off the extension 60 of the shuttle frame so as to deposit it in the pipe rack to the left of the carriage (Figure 1). This leaves the pusher 65 in position for a reverse movement. Energizing unit 67 may thus return the pusher 65, taking the next pallet off the rollers 50 and pushing it all the way off the extension 61 of the shuttle frame, thus stowing it in the right hand pipe rack.

As soon as the pipe racks to left and right of the shuttle have been loaded, it is necessary to drop or raise the shuttle by a distance equal to the vertical spacing between pipe racks. For this purpose the shuttle is mounted for sliding upwardly and downwardly, being guided by vertical tracks and frame members 70 and 71 and its weight being counterbalanced by cables 72 running up over sheaves 73 and attached to counterbalance weights 74. Sprocket chains 75 are attached to the shuttle frame at 76 and run around idler sprockets 77 and drive sprockets 78. The loose ends of the sprocket chains 75 are connected back to the shuttle through cables 79 running around sheaves 80, and slack in the sprocket chains is taken up by means of idlers 81 adjustable on tracks 82. Drive sprockets 78 are fixed to a cross shaft 83, which is driven by bevel gearing 84 from a jack shaft 85 which in turn is driven by sprocket 86, chain 87, sprocket 88 and a manual crank handle 89. These elements are arranged so that one turn of the crank 89 will raise or lower the shuttle through a distance equal to the vertical spacing between the pipe racks. Using the elements thus far described, the operator, located in any suitable place, as for example on the seat 90, may alternately fill the pipe racks to either side of the carriage with two vertical tiers of pallets. Assuming that the operator is filling first the lowermost racks of these vertical tiers, he will continue to operate the shuttle to fill first a rack on one side and then on the other, and then will operate the crank 89 to lift the shuttle, filling the next higher rack on each side, and so on, until all racks have been filled. Should a carrier 13 fail to receive a pallet, the operator merely waits until a succeeding carrier has deposited a pallet on the shuttle mechanism before actuating the latter.

It now becomes necessary to advance the carriage by the width of a pallet and the desired spacing between pallets. This is accomplished by means of the lever 91 rotatably carried on the axle of wheels 7 and carrying a spring pressed catch rod 92 operated by means of the spring handle member 93. The end of rod 92 is positioned for entry into any of a number of sockets 94 formed in a disc 95 keyed to the axle of the wheel 7. As will be apparent, raising the lever 91 so as to rotate the axle of wheel 7 will move the carriage to the desired extent. The spring pressed rod may now be released and the lever may be moved back into starting position so as to engage in the next socket 94. These sockets may be spaced around the disc 95 at convenient intervals, such as 60°, the parts being dimensioned so that the angular spacing between sockets corresponds to a movement of the carriage through the desired interval. When it is necessary to move the carriage somewhat more, as in passing a vertical support for the pipe rack, a partial movement of wheel 7 may be added by the operator.

As will be evident, the conveyors 9 constituting the elevator mechanism are power driven, as also is the pusher 65 of the shuttle mechanism. While the mechanism for raising the lower shuttle mechanism and for advancing the carriage may be power operated and power means for operating these mechanisms is disclosed hereinafter, the effort required in operation will be small in any event. With reference to the shuttle mechanism, which is suspended by the sprocket chains 75 and by the counterbalance cables 72, this mechanism may ride freely up and down, being held in position by the vertical guides 70 and 71 and due to its suspension by the raising and lowering sprockets 75 and by the counterbalance cables at four separated points, as indicated, it will be substantially balanced at all times, regardless of the position of a single pallet thereon.

The specific type of motive power used for the various elements of the brick handling mechanism will depend to some extent upon the availability of power sources of one type or another in the brick yard and upon convenience of servicing. Pneumatic actuators may be substituted for the electrical and manual elements just described, where airlines of sufficient capacity are conveniently available or the servicing of pneumatic equipment is considered simpler. Ordinarily, however, electric or hydraulic equipment will be preferred.

Figure 6:
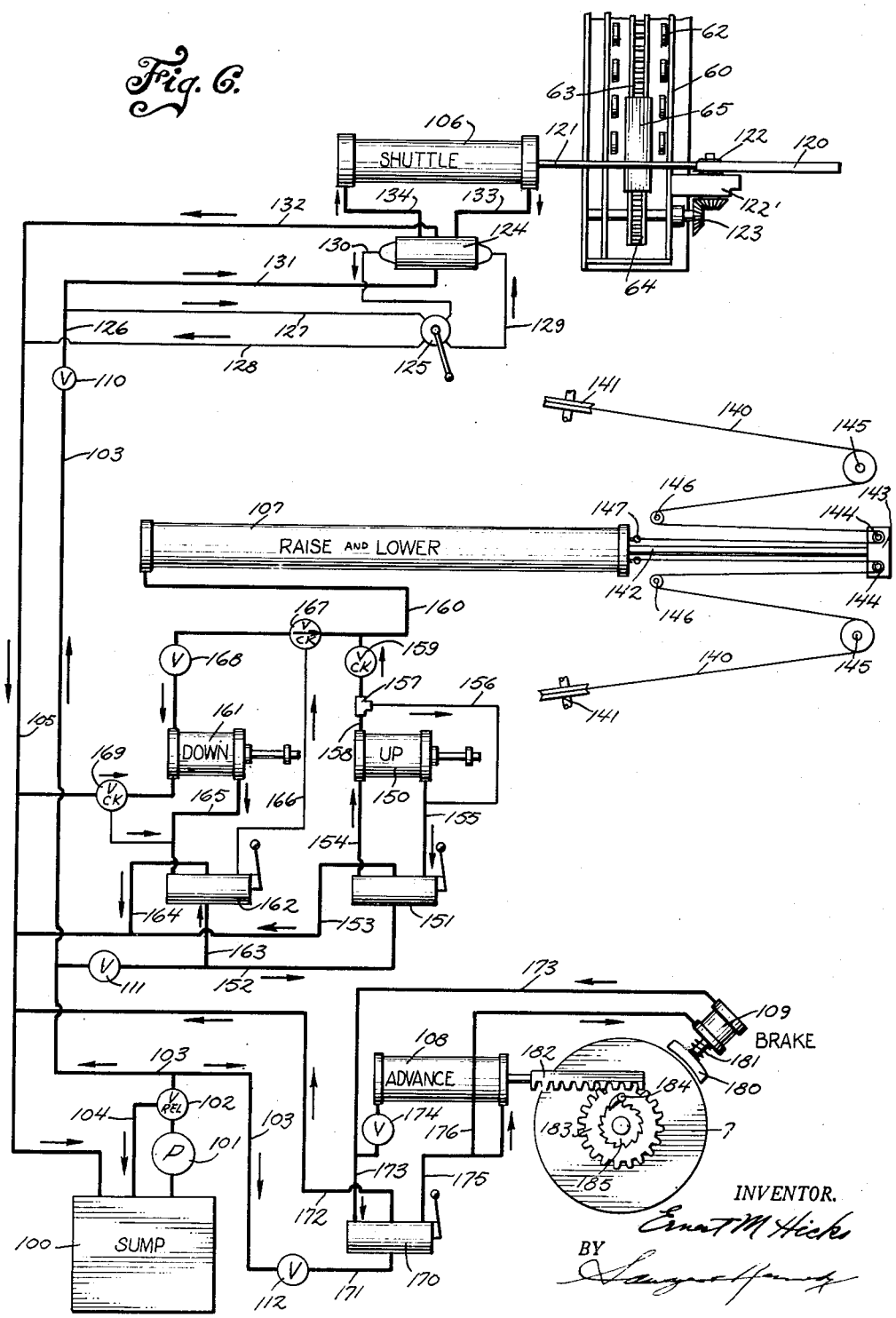
Figure 6 is a hydraulic circuit diagram showing suitable hydraulic mechanism which may be substituted for the operating mechanism in the embodiment of Figure 1, where hydraulic operation is preferred.
Figure 7:
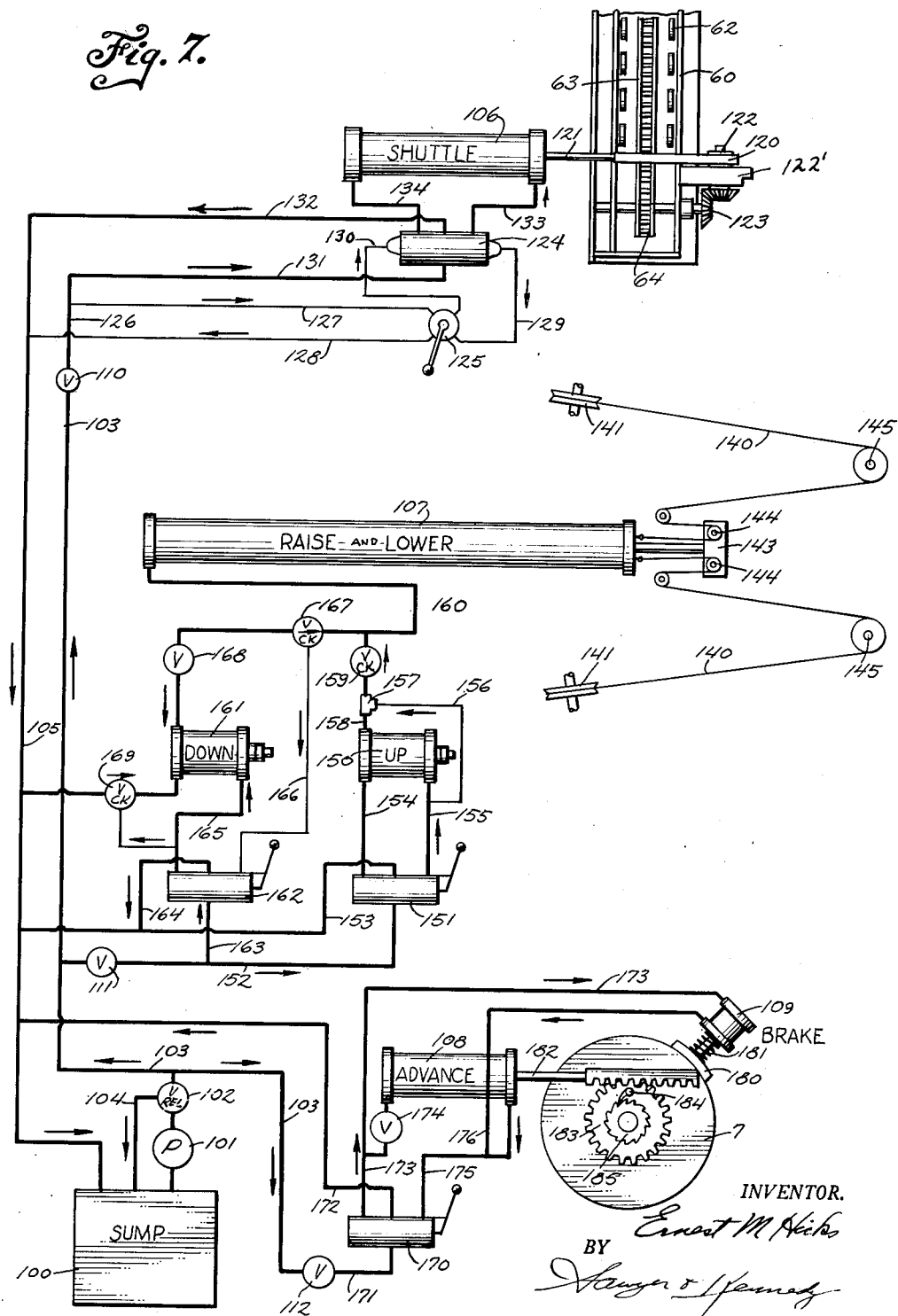
Figure 7 is a figure similar to Figure 6 but showing the various parts in different positions.

Figures 6 and 7 illustrate, largely schematically, suitable hydraulic actuators and mechanism for operating the brick handling machine hydraulically. A suitable source of high pressure oil, which may be on the carriage itself or connected thereto by hydraulic hose, is provided and will comprise a sump 100 from which oil is taken by an electric motor driven pump 101 and pumped through relief valve 102 to the high pressure supply line 103. The relief valve 102 serves to maintain a substantially constant pressure, which need not be more than about 200 p. s. i., in the high pressure line 103, the excess oil pumped being bypassed back to the sump through a return line 104. The oil supplied to the hydraulic operating elements from the high pressure line 103 is returned through low pressure or return line 105.

The elements operated consist generally of a shuttle actuator 106 and associated controls and mechanism, a raise and lower actuator 107 for raising and lowering the shuttle in steps, and its associated mechanism, and an advance actuator 108 and brake actuator 109 for moving the carriage along in steps as required. Manually operated globe valves 110, 111 and 112 are provided for cutting out any of these three systems in case of leakage or other emergency and may also be used for throttling the oil supply to any of the three systems so as to balance and regulate the speed of operation obtained. To clarify the operation, each of these systems is shown with its parts in one of its operating positions in Figure 6 and in a different operating position in Figure 7.

Figure 2:
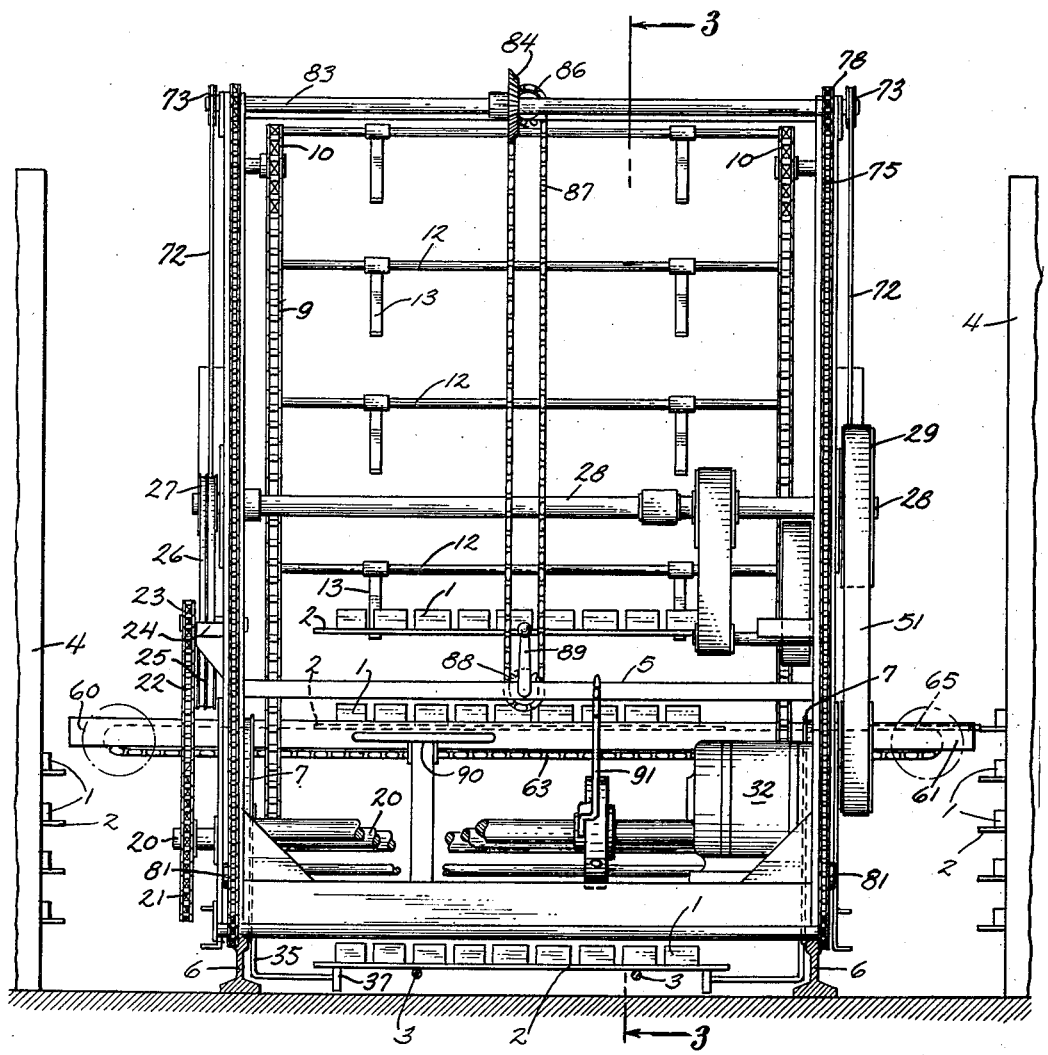
Figure 2 is an end elevation of the mechanism of Figure 1.

There is shown in Figures 6 and 7 the end frame extension 69 of the shuttle frame, which is shown completely in Figures 2 and 4. The motor and reducer unit 66 of the embodiment of Figures 1–5, is eliminated as well as the corresponding unit 67 at the other end of the shuttle frame and the hydraulic actuator 106 and associated mechanism are substituted therefor. The sprocket chain 63 carrying the pusher 65 is driven by sprocket wheel 64 as before, but the corresponding sprocket wheel 64 at the other end of the shuttle will be idle. The drive for sprocket 64 comprises a rack 120 attached to the piston rod 121 of the shuttle actuator 106 and driving a pinion 122 which, through gear box 122' and bevel gearing 123, drives the sprocket wheel 64. The rack and pinion and gearing are arranged to give the proper extent of movement to the pusher 65 for a full stroke of the shuttle actuator 106. With a twelve inch stroke on the actuator, the gear ratio may be 6 to 1 or thereabouts, so as to give a six foot stroke of the pusher 65, this being sufficient to carry it from one end of the shuttle to the other.

Figure 6 shows the pusher 65 near its limit of movement in one direction and corresponding to the connection of the left hand end of the shuttle actuator 106 to the high pressure line. The shuttle actuator 106 is operated by means of the pilot operated valve 124 and control valve 125. The control valve 125 is connected to high pressure line 103 through lines 126 and 127, and to the low pressure or return line 105 through a line 128. The valve is also connected to the pilot operated valve 124, for operating the same by lines 129 and 130. Valve 124 is similarly connected to the high and low pressure lines through lines 131 and 132 and to the two ends of the shuttle cylinder 106 through lines 133 and 134. Valve 125 is a two-way or reversing valve. In one position, as shown in Figure 6, it connects lines 127 and 129 together and also connects lines 128 and 130 together. The direction of oil flow will be as indicated in Figure 6. The valve 124 is also a two way or reversing valve and when operated by pressure applied through line 129 connects line 133 with low pressure line 132 and line 134 with high pressure line 131, thus forcing the piston of the shuttle actuator 106 to the extreme right.

Moving the operating handle of valve 125 to its other position as indicated in Figure 7 reverses the connections, so that line 129 is now connected to the low pressure line 128 and line 130 is connected to the high pressure line 127. This operates the valve 124 in the opposite direction, connecting line 133 to high pressure line 131 and connecting line 134 to low pressure line 132, thus forcing the piston of the shuttle actuator 106 to the left. This retracts the rack 120, which rotates the sprocket wheel 64 in a reverse direction. Pusher 65 does not appear in Figure 7 since it will have been moved to the opposite end of the shuttle frame.

The shuttle actuator rack and associated gearing may be mounted in any convenient position upon the unit, a mounting upon and somewhat above the shuttle frame as indicated in Figures 6 and 7, while leaving sufficient space for the pallets to pass under, being satisfactory.

The raise and lower actuator 107 may be connected to the shuttle by means of a pair of cables 140, corresponding to the sprocket chains 75 previously referred to, and running over a pair of diagonal sheaves 141 which are substituted for idle sprockets 77 in the embodiment of Figures 1 to 5. The piston rod 142 on the actuator carries a cross head 143 upon which are mounted a pair of sheaves 144. The cables 140 also pass around fixed sheaves 145 and 146 and their ends 147 are also fixed as by securing them to the actuator as indicated in the figures. By reason of the lead of the cables on the sheaves the motion of the piston rod 142 is doubled so that an actuator with three foot stroke, or the like, may raise and lower the shuttle to a total distance of six feet, or other height, corresponding to the loading height of the pipe racks. Movement of the piston rod 142 fully to the right will raise the shuttle mechanism to the maximum extent. The piston rod is shown in an intermediate position in Figure 6 and almost completely retracted in Figure 7. The actuator 107 is operated in steps for raising and lowering the shuttle in the manner now to be described.

A measuring cylinder 150 is provided for introducing oil into the actuator 107 for raising the shuttle and is controlled by a two-way valve 151. This valve is connected to the high and low pressure lines respectively, by lines 152 and 153 and is connected to the two ends of the measuring cylinder 150 by lines 154 and 155. Bypass line 156 leads to pilot operated valve 157, connected through a line 158 to the left end of the measuring cylinder 150, and also connected through a check valve 159 to supply line 160 for introducing oil into the actuator 107. With the valve 151 set in one position as indicated in Figure 6, line 154 is connected to high pressure line 152 and line 155 is connected to return line 153. High pressure oil is thus supplied to the left end of the measuring cylinder 150 and low pressure oil is discharged back from the right hand end of this cylinder through the line 155. During this operation valve 157 which is arranged to open upon application of pressure by line 156 will be closed since the bypass control line 156 is connected to the low pressure line. The left hand end of the measuring cylinder 150 is, accordingly, filled. If now valve 151 is set in its other position as indicated in Figure 7, line 155 will be connected to the high pressure line and line 154 will be closed off at the valve 151. Since line 156 is connected to line 155 it will also be under high pressure and will operate valve 157 to open the same. High pressure oil introduced through line 155 is thus permitted to force the piston of the measuring cylinder to the left discharging the oil at the left end of the cylinder through valve 157 and check valve 159 into supply line 160 for the actuator 107. This supply of oil ceases when the piston of the measuring cylinder has come to the limit of its stroke and there is thus introduced into the actuator for each operation of the valve 151 as just described, a measured quantity of oil, resulting in the movement of the actuator piston through a predetermined and definite distance and accordingly raising the shuttle by a definite distance or increment of movement.

Starting with the shuttle in its lowermost position, the repeated operation of the valve 151 will thus raise it in steps for filling the successive levels or tiers of pallets in the pipe racks. The cycle of operations is the same as in the embodiment of Figures 1 to 5. The operator first, by means of valve 125 as previously described, operates the shuttle actuator in both directions thus putting a pallet in each of the pipe racks to the right and left. Next he operates the valve 151 to raise the shuttle by one step and again operates the valve 125 so as to stow a pallet to right and left. This sequence of operations is repeated until two complete vertical tiers of pallets have been built up.

The arrangement for lowering the shuttle carrier is generally similar to that provided for raising it. It includes a down measuring cylinder 161 and a control valve 162 therefor. The control valve 162 is connected to high pressure through a line 163 and to low pressure through a line 164 and is connected to one end of the measuring cylinder 161 through a line 165. A control line 166 leads from the valve 162 to a pilot operated check valve 167. The left end of the measuring cylinder 161 is connected through a hand operated globe valve 168 and pilot operated check valve 167 to the supply line 160 for the actuator 107, and is also connected to low pressure line 105 through a pilot operated check valve 169 which is controlled by the pressure in line 165, as indicated.

With valve 162 in the position of Figure 6, line 165 connects to low pressure line 164 and control line 166 connects to high pressure line 163. Check valve 167, under control of high pressure in line 166 opens, permitting oil to flow back from actuator 107 through line 160 and valves 167 and 168 onto the left end of measuring cylinder 161. Line 165 being at low pressure, check valve 169 prevents flow from the left end of cylinder 161 which accordingly fills with oil from cylinder 107, forcing its piston to the right and emptying its right end through lines 165 and 164. Measuring cylinder 161 thus receives a definite quantity of oil from actuator 107, determined by the stroke of the piston of measuring cylinder 161 and the shuttle mechanism is permitted to descend through a definite distance corresponding to the spacing between pipes on the racks.

Shifting valve 162 to the position of Figure 7 reconnects the lines, as indicated by the arrows. Line 165 being connected to high pressure line 164, fills the right end of cylinder 161, forcing the piston to the left and emptying the left end of the cylinder. The discharged oil flows back through pilot-operated check valve 169, which is open by reason of the high pressure in line 165. Discharged oil does not pass through valves 168 and 167, since the pressure in line 160 (caused by the tension in cables 140 supporting the shuttle mechanism) will be higher than that in the low pressure return line 105.

By repeating the operations just described the operator is enabled to load the pipe racks with pallets from top to bottom, first operating valve 125 to stow a pallet to left and right, then operating valve 162 to drop the shuttle one step and repeating this process until the bottom pipe is reached.

The extent of up and down movement in each step, which is controlled by the measuring cylinders 150 and 161, may be adjusted by regulating the stroke of the pistons of these cylinders, as by means of substituting or shifting the collars on the piston rods which are indicated in the drawings. Globe valve 168 is utilized to regulate the speed of downward movement of the shuttle mechanism, and this may be used together with valve 111 to provide for regulation of both the speed of downward movement and the speed of upward movement.

For moving the carriage along the pipe rack, there may be substituted for the lever 92 and disc 95 a hydraulic actuating mechanism operated by the advance cylinder 108 as shown in Figures 6 and 7 and a brake actuator 109 which operates on the rim of one of the wheels 7. This mechanism is controlled by a valve 170 similar to the valve 162 already discussed and which again is a two-way or reversing valve. This valve is connected to high and low pressure fluid through lines 171 and 172 and is connected to the two ends of the advance and brake actuators 108 and 109 through lines 173 and 175.

A manually operated globe valve 174 is interposed between the valve and the advance cylinder 108 so as to permit regulation of the speed of operation of this cylinder relative to the brake cylinder. As will be apparent, this valve taken in conjunction with globe valve 112 permits regulation of the action of both cylinders as desired.

With the valve 170 in the position of Figure 6, high pressure fluid is admitted to the right-hand end of the actuator 108 and low pressure fluid is exhausted from its left end. The piston rod 182 of cylinder 108 carries a rack which meshes with a pinion 183 loose on the axle of the wheels 7 and coupled thereto by means of a spring pawl 184, carried on the pinion 183, and cooperating with a ratchet wheel 185 fixed to the axle of the wheel 7. As will be apparent, the leftward motion of the piston rod of cylinder 108 and of the rack carried by piston rod 182 will cause a rotation of the wheel 7 corresponding to the stroke of the piston and will thus move the carriage along the pipe racks through the desired interval. At the same time, the brake cylinder 109 will have been supplied with high pressure fluid at one end through lines 175 and 176 and its other end will have been exhausted through lines 173. This lifts the brake 180 off wheel 7 against the pressure of spring 181 and permits the movement of the wheel by the advance actuator as just described.

Moving the valve 170 to the position of Figure 7 reverses the fluid connections as indicated, applying braking pressure and filling the advance cylinder 108 on the left and exhausting it on the right. This moves the piston rod 182 and rack carried thereby to the right as indicated in the figure, in preparation for another movement of the carriage. Wheel 7 will not rotate during this movement, since pawl 184 rides back over the ratchet 185 without turning the same. The advance actuator mechanism is capable of inching movements, as will be apparent. For example, if it is desired to move the carriage through a larger interval than ordinary, as where upright support member of the pipe racks must be passed, the operator may move the valve 170 to the position of Figure 6 for a short time, causing a partial stroke of the actuator 108, and may then move back to the position of Figure 7, the result being a small rotation of the wheel 7 and consequent small movement of the carriage and the parts automatically repositioning themselves for another inching movement or for a full actuation of the elements as may be desired.

What is claimed is:

1. In a brick handling mechanism, the combination with a pair of pipe racks provided with spaced supports having a space therebetween and a brick pallet supply conveyor located in the space for moving pallets successively along the pipe racks, of a carriage movable along the supply conveyor, an elevator mechanism comprising an endless conveyor mounted on the carriage and pallet carriers attached at intervals along the endless conveyor, the endless conveyor having a lower course running along and oppositely to the supply conveyor for picking up pallets successively therefrom and an upward course and a downward course for first carrying pallets upwardly and then downwardly, a shuttle mechanism on the carriage spaced from the upward course of the elevator mechanism, positioned for receiving pallets from its carriers during their downward movement and having means for shoving the pallets to the right and to the left into the pipe racks, and means for raising and lowering the shuttle mechanism in steps corresponding to the vertical spacing of said supports.

2. In a brick handling mechanism, the combination with a pair of pipe racks provided with spaced supports having a space therebetween and a brick pallet supply conveyor located in the space for moving pallets successively along the pipe racks, of a carriage movable along the supply conveyor, an elevator mechanism comprising an endless conveyor mounted on the carriage and pallet carriers attached at intervals along the endless conveyor, the endless conveyor having a lower course running along and oppositely to the supply conveyor for picking up pallets successively therefrom and an upward course and a downward course for first carrying pallets upwardly and then downwardly, a shuttle mechanism on the carriage spaced from the upward course of the elevator mechanism, positioned for receiving pallets from its carriers during their downward movement and having means for shoving the pallets to the right and to the left into the pipe racks, latch mechanism for holding back a pallet on the supply conveyor when a carrier positioned for receiving the same is already loaded, and means for raising and lowering the shuttle mechanism in steps corresponding to the vertical spacing of said supports.

ERNEST M. HICKS.

References Cited in the file of this patent

UNITED STATES PATENTS

| Number | Name | Date |
| --- | --- | --- |
| 840,189 | Alvey | Jan. 1, 1907 |
| 844,806 | Jones | Feb. 19, 1907 |
| 1,354,223 | Slattery | Sept. 28, 1920 |
| 1,430,160 | Eggert | Sept. 26, 1922 |
| 1,441,661 | Church | Jan. 9, 1923 |
| 1,522,600 | Strickland | Jan. 13, 1925 |
| 1,557,776 | Russell | Oct. 20, 1925 |
| 1,828,307 | Been | Oct. 20, 1931 |
| 2,493,493 | Mariano | Jan. 3, 1950 |